United States Patent
Zamanzadeh et al.

(10) Patent No.: US 6,535,917 B1
(45) Date of Patent: Mar. 18, 2003

(54) MARKET DATA DOMAIN AND ENTERPRISE SYSTEM IMPLEMENTED BY A MASTER ENTITLEMENT PROCESSOR

(75) Inventors: Behzad Zamanzadeh, Tarzana, CA (US); Robert D. Shallenberger, Culver City, CA (US); Mohsen Farry, Calabasas, CA (US); Hariah Maihotra, Simi Valley, CA (US)

(73) Assignee: Reuters, Ltd., London (GB)

(*) Notice: Subject to any disclaimer, the term of this patent is extended or adjusted under 35 U.S.C. 154(b) by 0 days.

(21) Appl. No.: 09/246,348

(22) Filed: Feb. 8, 1999

Related U.S. Application Data

(60) Provisional application No. 60/074,089, filed on Feb. 9, 1998, provisional application No. 60/074,064, filed on Feb. 9, 1998, and provisional application No. 60/074,084, filed on Feb. 9, 1998.

(51) Int. Cl.[7] ............................................. G06F 15/173
(52) U.S. Cl. ...................... 709/225; 709/201; 709/203; 709/217; 709/218; 709/219; 709/226; 709/229; 709/104.1; 709/10; 709/9; 713/200; 713/201; 713/202
(58) Field of Search ................................ 709/201–203, 709/225–229, 217–219; 707/9, 10, 104, 509; 713/200–202; 719/217–229

(56) References Cited

U.S. PATENT DOCUMENTS

| | | | |
|---|---|---|---|
| 4,130,870 A | * 12/1978 | Schneider | 364/200 |
| 5,684,951 A | 11/1997 | Goldman et al. | 395/188.01 |
| 5,838,903 A | * 11/1998 | Blakely, III | 395/188.01 |
| 5,864,871 A | * 1/1999 | Kitain | 707/104 |
| 6,078,960 A | * 6/2000 | Ballarld | 709/229 |
| 6,145,089 A | * 11/2000 | Le et al. | 714/4 |
| 6,195,680 B1 | * 2/2001 | Goldszmidt | 709/203 |

FOREIGN PATENT DOCUMENTS

| | | |
|---|---|---|
| WO | 96/42041 | 12/1996 |
| WO | WO 96/42041 | * 12/1996 |

OTHER PUBLICATIONS

C.J. Date, "An Architecture for a Database System," An Introduction to Database Systems, 6th edition, Addison–Wesley Publishing Company, Inc., pp. 42–48, 602, (1995).

* cited by examiner

Primary Examiner—Glenton B. Burgess
Assistant Examiner—Hieu Le
(74) Attorney, Agent, or Firm—Banner & Witcoff, Ltd.

(57) ABSTRACT

A computer system including a master entitlement processor for storing user information, such as user passwords and access permissions, and a user computer system for allowing a user to operate an application in accordance with the user information corresponding to the user. The user computer system preferably includes a plurality of server computers organized into an enterprise including a plurality of domains. Two-way communication between the master entitlement processor and the server computers facilitates accurate storage, reliable access and easy modification of the user information. Organization of the server computers into domains allows good fault tolerance and robust failover and failback operations through static and dynamic loadbalancing.

37 Claims, 6 Drawing Sheets

| USER NUMBER | TABLE DRIVEN ACCESS PERMISSION LISTS | | | |
|---|---|---|---|---|
| | BIT 1 | BIT 2 | BIT 3 | BIT 4 |
| 001 | 1 | 0 | 1 | 0 |
| 010 | 0 | 0 | 0 | 1 |
| 011 | 1 | 0 | 0 | 0 |
| . | . | . | . | . |
| . | . | . | . | . |
| . | . | . | . | . |
| 111 | 1 | 1 | 1 | 1 |

LOCAL CACHE

LOCAL CACHE — 157

DYNAMIC TABLE — 203

| Bit Position | Hard Code (Numeric) | Hard Code (Alphanumeric) | Service Name | Service Grouping | Long Name |
|---|---|---|---|---|---|
| BIT 1 | 100001 | NYSE | XCHNG Y | 1: state exchanges | New York Stock Exchange |
| BIT 2 | 110010 | PASE | XCHNG X | 1: state exchanges | Pennsylvania Stock Exchange |
| BIT 3 | 111111 | JPSE | XCHNG W | 2: int'l exchanges | Japan Stock Exchange |
| BIT 4 | 000001 | EUSE | XCHNG Z | 2: int'l exchanges | European Stock Exchange |

MARKET DATA DOMAIN AND ENTERPRISE SYSTEM IMPLEMENTED BY A MASTER ENTITLEMENT PROCESSOR

RELATED APPLICATIONS

This application claims the benefit of the following provisional applications: (1) U.S. Provisional Application No. 60/074,089 (filed Feb. 9, 1998), (2) U.S. Provisional Application No. 60/074,064 (filed Feb. 9, 1998), and (3) U.S. Provisional Application No. 60/074,084 (filed Feb. 9, 1998).

BACKGROUND

1. Field of the Invention

This invention relates generally to computer systems having a master entitlement processor for storage and maintenance of a dynamic database of user information, which user information is utilized by an application run on a user computer system. More particularly, this invention relates to computer systems which allow two-way communication of user information between master entitlement processors and a user computer system.

2. Description of the Related Art

In conventional computer systems having a master entitlement processor, the master entitlement processor stores user information, such as user ID numbers, user passwords and user permission information for use by the user computer system (for example, servers and associated user workstations) when the user computer system runs applications.

Reference to the user information stored in the master entitlement processor (MEP) causes the applications to be controlled in a predetermined manner appropriate for the specific user based on the user information. For example, if the user password is not among the user passwords in the MEP database of user information, then the user cannot use the applications at all. As another example, if the user permission information permits the user access to some features of the applications, but not to others, then the applications will be controlled to allow the user to access only the permitted features.

The user information can be changed in the MEP through dedicated management information system (MIS) workstations, but not through the user computer system itself. As a practical matter, this can make it difficult to change user information for the user. For example, if the user wants to change her password, she must have this operation performed by somebody with access to an MIS workstation.

This also limits the types of user information which can be stored in the MEP database. For example, the user information will not include the identity of the server(s) which the user is currently logged into because these servers have no way of communicating this information to the MEP, and because the MEP cannot receive user information from the user computer system.

Also, in many conventional master entitlement processor systems (that is, computer systems which include an MEP and a user computer system), each user is limited to logging into a single, predetermined server. This means that a users will not be able to run the application if her predetermined server experiences failure conditions. In this kind of system, the user's designated server may receive from the MEP and store the user's user information in memory or on a magnetic disk. However, the user's user information will not be present on any other servers in the system.

SUMMARY OF THE INVENTION

It is an object of the present invention to provide a master entitlement processor system wherein user information can be easily modified in an MEP and readily distributed to all computers in the user computer system. It is also an object of this invention to store user permission data in a compact form which can easily adapt to changes in the permission scheme. It is a further object of the invention to provide robust failover and failback operations through the organization of servers into an enterprise/domain/server hierarchy.

It is a feature of the present invention that there is communication of user information from a user computer system up to an MEP. It is another feature of the invention that user permission information is stored in a table-driven format which is expanded through the use of a dynamic table into a predetermined format suitable for an application. It is a further feature of this invention that servers are organized into sets, referred to as domains.

It is an advantage of the present invention that users can easily change at least some portion of their user information. It is another advantage of the invention that the permission scheme does not have to be hard-coded into the user computer system. It is a further advantage of this invention that users can continue to run applications without substantial interruption upon failure of some, or even all, servers in a domain.

It is an advantage of the present invention that enterprises (such as a market data enterprise) can be extended over a publicly connected network so that each enterprise will be using its own resources. In this case, users belonging to an enterprise will be limited to servers in their own enterprise.

According to one aspect of the present invention, a master entitlement processor system includes an MEP, a user computer system (UCS), and communication means for providing two-way data communication between the MEP and the UCS. The MEP has code for storing a database of user information, and for modifying the database according to data received from the UCS through the communication means. The UCS has code for supporting at least one application, for receiving user information from the MEP, and for sending user information database modification instructions to the MEP. In this way the system can provide for central control and maintenance of user information as well as distributed (local) control and maintenance of such information.

According to a second aspect of the invention, a computer system includes a first computer (for example, an MEP computer), a second computer (for example, a server/workstation) and a communication means. The first computer stores a table-driven access permission list in the form of a variable-length string of bits wherein each bit represents the status of a specific permission for a user. The second computer stores a dynamic table and code for expanding the table into permission information in a predetermined format using the dynamic table. The expanded-format permission information can then be directly utilized by applications to control which features of the applications that specific user will be able to access.

According to a third aspect of the present invention, an enterprise computer system includes a first domain, a second domain and a user computer. The first domain includes a plurality of first-domain server computers. The second domain includes a plurality of second-domain server computers. Program code located in each of the server computers allows a user to log into any one of the server computers in at least one of the first and second domains, and thereafter to receive data from the server computer which the user is logged into. The domain structure can be used to maintain the users server access in a controlled, yet flexible, manner, because a particular user may be preferably directed to a particular domain (that is, set of servers) without being rigidly tied to a single, specific server.

BRIEF DESCRIPTION OF THE DRAWING

The objects, advantages and features of the present invention will become more readily apparent from the following detailed description, taken together with the accompanying drawing, in which:

FIG. 5 is a dynamic table for expanding access permission lists which is stored in the FIG. 1 system;

DETAILED DESCRIPTION OF THE PREFERRED EMBODIMENTS

Figure 1:
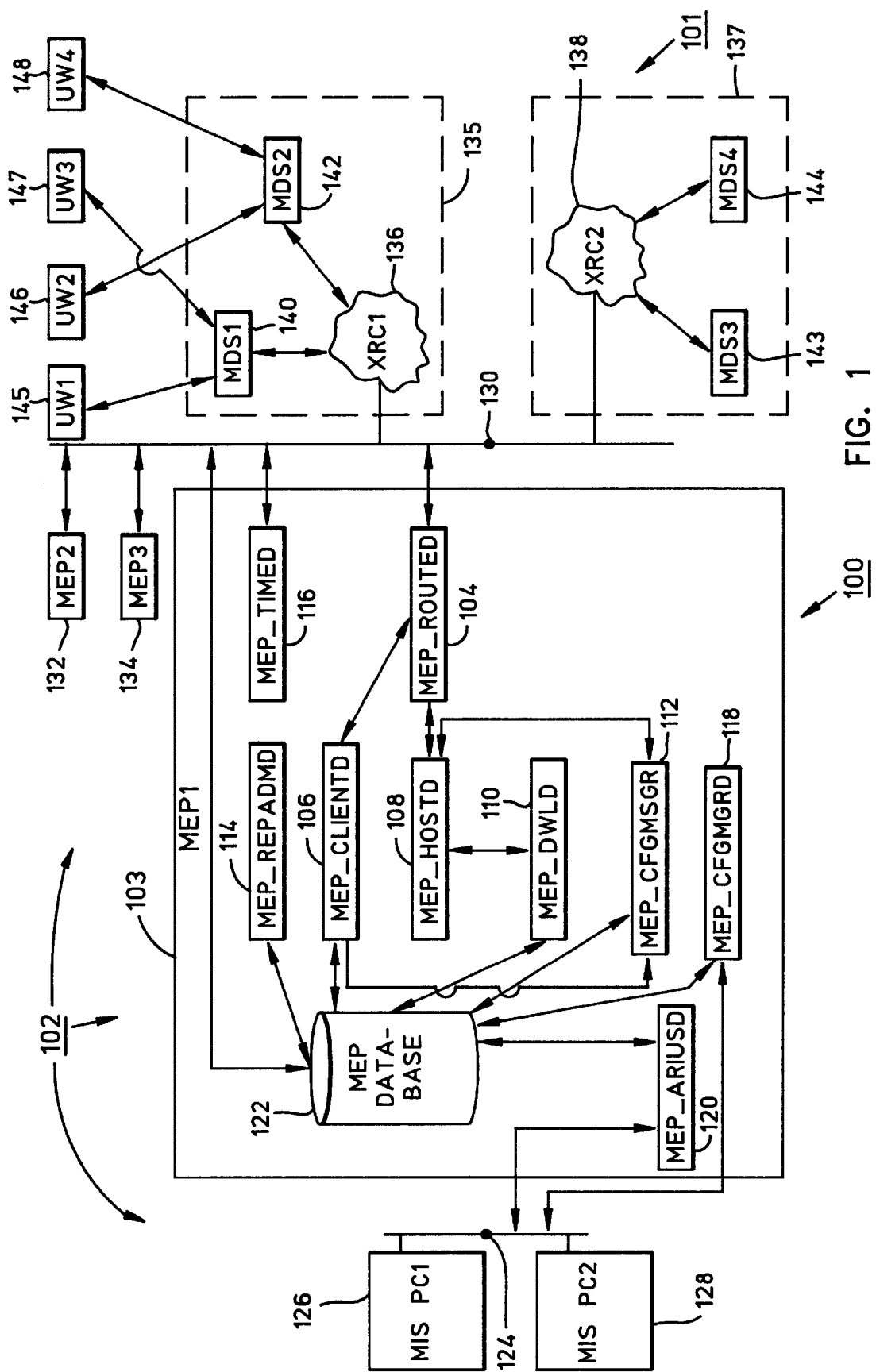
FIG. 1 is a block diagram of an embodiment of a master entitlement processor system according to the present invention.

The present invention will now be explained with reference to one particular market data computer system. Although the computer sytem is designed for running a market data application for delivering financial information, the present invention is not limited to this, and broadly applies to any computer system wherein any type of users use computers for any reason. Also, the embodiment discussed below has, for the sake of simplicity, only a very limited number of server computers and user workstations. In many preferred embodiments, the number of users, computers and domains will be much larger because most enterprises (such as large companies) have many users (such as employees) distributed over many domains (such as branch offices). Before discussing the embodiments shown in the figures, the present invention will first be described in somewhat general terms.

An MEP may be used in conjunction with a user computer system through public networks (for example, the Internet) or private networks. The user computer system embodiments discussed herein will be user computer systems for running a market data application which is used to deliver financial information, such as information about transactions in stock exchanges, to interested users, such as brokers. In these embodiments, the user computer system will generally include many market data servers and user workstations. The user workstations generally run the market data applications with support from a market data server in the areas of user information (for example, user password verification) and provision of substantive market data information. As an example of providing substantive market data information, the market data server collects financial information from various financial exchanges and delivers it to the user workstation as appropriate based on the user permissions.

First, the concept of an enterprise will be explained. The enterprise consists of a set of customer's data centers, domains, market data servers, user workstations and users. For example, in the market data services context, a market data enterprise is preferably an extension of services provided by a brokerage and trading firm to its employees where they can get professional and exclusive market information whenever and wherever they can establish connectivity between their desktop computer and enterprise servers.

The following functions are preferably managed at an enterprise level: (1) user administration, (2) entitlements, (3) user authentication and locking, (4) failover, and (5) controlling user profile. Further information on a preferred scheme for controlling user profile is provided in co-pending U.S. Provisional Application No. 60/074,142 which is herein incorporated by reference in its entirety.

The firm-wide or enterprise-wide permission informations (entitlements) allows the user to access his or her entitled market data services at any location within the enterprise. A user can get market data services from any workstation using a valid User ID (QUID) login. The central locking mechanism guarantees that users can only log in once into the market data enterprise at any time. As used herein, the term "workstation" is not limited to stationary computers. For example, a user workstation may be a portable personal computer (PC). Each enterprise is uniquely identified with the customer's account ID.

Users accessing market data from home or on the road are also considered part of the enterprise. Users can only get market data services from servers in their respective enterprise. There is one exception to this rule. In the case where users from two different firms share the same server, there are provisions to accommodate users of the second enterprise. This is done by assigning the servers from the first enterprise in the list of authorized servers for the QUID's belonging to the second enterprise.

A domain is a set of cooperating market data servers. All of the market data servers within a branch office could make up a domain. The domain concept makes it possible to construct a superior fault-tolerant architecture within a multiple server office or between smaller offices with only one server. The domain architectures allows system designers to provide a higher level of redundant market data service which can survive multiple failures as well as catastrophic failures.

Domain servers improve overall reliability and performance of the system by providing failover, failback and load balancing among each other. Organizing servers into a domain structure can provide better capability to fully recover from any system failure conditions such as failure of external services, distribution network component failure, communication line failure, as well as server and workstation failure.

Loadbalancing within a domain can be static or dynamic. Loadbalancing across domains are usually static. Static Loadbalancing is preferably based on a user configuration table. The user configuration table allows multiple servers to be defined for each user. These servers are defined in priority order. The first server is the user's primary server which also identifies the primary domain. The remaining servers may be in the primary domain or in other domains as well as being a web. Servers and workstations in a domain can be scattered over local and remote LAN segments.

A preferred embodiment of a master entitlement processor system for running a market data application over enterprise-wide system 100 will now be described in detail with reference to FIGS. 1 through 8. As shown in FIG. 1, enterprise 100 includes user computer system 101 and master entitlement processor set 102. UCS 101 allows users enterprise-wide to run market data applications which provides access to current financial information. The master entitlement processor set 102 keeps track of various user information relating to each user in the enterprise.

More particularly, user computer system (UCS) 101 includes first domain 135, user workstations 145, 146, 147, 148 and second domain 137. In some preferred embodiments of the present invention, a market data computer system will include market data servers and market data distribution systems (such as POP-CONC and XRC). Each domain is a set of at least two market data servers (MDS). Domain 135 is a domain corresponding to a branch office of a brokerage. Domain 135 has two market data servers, MDS1 140 and MDS2 142. The MDS's may be, for example, a model RS/6000, sold by IBM Corporation. MDS1 140 and MDS2 142 can communicate with each other, with master entitlement processor set 102 or with various market data information sources via conventional XRC1 cloud 136 and network 130.

As explained in more detail below, because there are two MDS's (MDS1 140 and MDS2 142), in the branch office, operations can continue in the branch office domain 135, even if one of the two MDS's experiences a failure condition, such as: (1) feed is down, (2) critical services are down, (3) communication failure, and (4) power shutdown. Although the exemplary domain 135 of this preferred embodiment has only two MDS's, additional MDS's could be added, especially as more users (for example, brokers) use the branch office facilities and cause increased load on the domain 135.

Since there is more than one MDS in domain 135, certain other aspects of the present invention become quite useful. For example, user locking, as explained below, can help prevent users from logging into more than one MDS at one time. Also, master entitlement processor set 102 according to the present invention can help provide reliable and timely maintenance of user information, which becomes especially important as users are logged into different MDS's at different times.

At the instant of time shown in FIG. 1, four user workstations, UW1 145, UW2 146, UW3 147 and UW4 148, are logged into MDS's 140, 142 of branch office domain 135. User workstations 145, 146, 147, 148 may be, for example, desktop or laptop personal computers with Pentium (a trademark of INTEL Corporation) processors and NT4 compatible network cards. They can be connected as shown to MDS's 140, 142 by any conventional kind of public or private network connection. As shown, in FIG. 1, UW1 145 and UW3 147 are logged into MDS1 140, and UW2 146 and UW4 148 are logged into MDS2 142.

The second domain 137 also includes two MDS's, MDS3 143 and MDS4 144. The second domain in this preferred embodiment is a central server farm. No user workstations are logged into the second domain 137. However, as further explained below, if one of the other domains in the system experienced a failure condition affecting every MDS in the domain, then user workstations could be switched into the central server farm domain 137 as a backup. MDS3 and MDS4 of the central server farm domain 137 communicate with each other, with the master entitlement processor set 102 and with various sources of market data through XRC2 cloud 138 and network 130.

Master entitlement processor set includes MEP1 103, MEP2 132, MEP3 134, management information system personal computer (MIS PC1) 126 and management information system personal computer (MIS PC2) 128. MIS PC1 126 and MIS PC2 128 can be used to access and program MEP1 103, similarly to the way in which conventional MEP's are programmed. It is noted that a master entitlement processor set 102 is often used to store user information for more than one enterprise, although preferrably the MEP's will prevent users from one enterprise from utilizing the system resources (such as servers) belonging to other enterprises.

The three MEP's are largely to provide for redundancy in case one or more of the MEP's experiences a failure condition. MEP's 103, 132, 134 may be constructed as, for example, RS6000 G40 model computers running with database replication. Each of the MEP's 103, 132, 134 is strategically located to provide 24-hour operation in the event of failure and is capable of serving all MDS's in the enterprise. While the MEP's stay current on user information by sharing changes in user information with all of the MEP's in the system, the identity of the specific MEP which may providing user information to the user's server and the flow of information between the MEP's is generally transparent to the users.

Now MEP1 103 will be described in detail with reference to FIG. 1. MEP1 103 includes code for nine daemons 104, 106, 108, 110, 112, 114, 116, 118 and 120, and for MEP database 122 which stores up-to-date user information for all of the users in the enterprise. As described below, the nine daemons allow modifications to MEP database 122 to be effected via the user computer system 101, as well as by the MISPC's 126, 128.

However, in this preferred embodiment, the permitted MEP database 122 modifications are limited to modifications of user password and current user login status and location. The assignment of user ID's and permissions may have consequences with respect to how the enterprise is billed for the market data services it receives, so these aspects of the user information in the MEP database 122 may preferably be modified only through the relatively secure and deliberate conventional method of utilizing the MISPC's 126, 128.

The nine daemons will now be described.

1.1. MEP Routed 104

Daemon MEP_ROUTED 104 communicates between other daemons and the MDS's of the domains 135, 137 through the two-way communication network 130 and the XRC clouds 136, 138. MEP_ROUTED accepts connections from all user sets that use an ARB with the appropriate MEP xrcquent entry in their "named.host" file. MEP_ROUTED 104 routes all packets between MDS's and the MEP daemons (MEP_CLIENTD and MEP_HOSTD). If MEP_ROUTED is down, then all XRC connections to MEP 103 will be down. Subsequently, no data will flow between MEP 103 and the MDS's.

1.2. Mep_Clientd

Handles all MDS requests between the MDS and the MEP Daemons or the MEP Database. Such requests include retrieving Quids that do not exist in the MDS cache, retrieval and storage of Quid User Configurations (passwords, primary/back-up servers, etc . . . ), storage or login activity, daily MEP signons from each MDS, upstream routing of Config messages, uploading files from MDS, etc . . . If this daemon is down, all requests from MDS will not be processed. This is a major component of the MEP Subsystem.

1.3. Mep_Hostd

Handles all MEP initiated transactions between MEP and the MDS. Such transactions include downloading scheduled Quids and User Configurations, downloading/uploading scheduled files, downloading Config messages, etc . . . Interfaces between mep_dwld to process download/upload requests. If this daemon is down, all MEP initiated requests will not be processed but will remain in the download queue to be processed when the daemon comes back up. This is a major component of the MEP Subsystem.

1.4. Mep_Dwld

Executes download requests at the given data/time entered in the Dwld_que Database table. Throttles jobs in the queue to insure that limits per site and per MEP system are not exceeded. Jobs are sent to the mep_hostd to be delivered to the site. If this daemon is down, no jobs in the Dwld_que table will be sent to the site. This affects all scheduled jobs.

1.5. Mep_Cfgmsgr

Supports Server Configuration uploading, downloading, and scheduling between MEP and MDSs. If this daemon is down, all Server Configurations support to the MDS will be down.

1.6. Mep_Repadmd

Periodically checks the health of the Oracle Replication services. Resolves database conflicts. Pushes failed replication jobs to other MEP nodes (checks every 5 minutes). If this daemon is down, Oracle replication will not resume automatically when it experiences problems with pushing data to other MEP nodes.

1.7. Mep_Timed

This daemon synchs up the time on the current MEP to the time on the Master MEP system. If this daemon is down, time synchronization between the MEP system will not occur.

1.8. Mep_Cfgmgrd

Provides initial login interface to support Arius II (MIS PC) and Server Config windows applications. Supports application access with the Server Config windows application. If this application is down, Arius II (MIS PC) and Server Config windows applications will not be able to log into MEP. Also, all Server Config windows application support will be down. Arius II users will still be able to operate if logged into MEP before mep_cfgmgrd went down (in regards to Arius, this application only initially authenticates the user for the Arius II windows application).

1.9. Mep_Ariusd

Handles requests for updates, retrievals, and scheduling of Quid Entitlements or Quid User Configuration between MEP and Arius II. If this daemon is down, Arius II users will not be able to use the Arius II windows application.

Now that MEP 103 (which can receive instructions to modify certain user information in its MEP user information database 122) has been described, exemplary MDS1 140 will be described in detail with reference to FIG. 3. The principal components of MDS1 are MEP agent 156 (including a local cache 157), RP server 158 (including MEP agent API 159), MDS application 160 (including MEP agent API 161), alert server 162, service map table 166, local cache disk image 168, and FIS daemon 178.

The MEP agent 156 resides on MDS1 140 and handles simultaneous two-way communications between MEP's 103, 132, 134 and MDS1 140 in an a synchronous, multiplexed manner. These two-way conversations generally involve user information. For example, user information, such as the updated location of an MDS where the user is logged in, or an updated user password, may be sent from MEP 103 to MDS 140 as part of one of the simultaneous conversations handled by MEP agent 156. As another example, database modification instructions to modify a user password may be sent from MEP agent 156 to MEP's 103, 132, 134 as part of a conversation wherein user information is transferred from MDS1 140 up to MEP 103.

The MEP agent preferably employs message based programming so that only changed data is delivered to MDS1 140. The messages are transferred between MEP agent 156 and MEP's 103, 132, 134 in the form of financial information services (FIS) packets. These FIS packets are 127 bytes long, and are preferably utilized in this embodiment because this is a pre-existing format which is conventionally used to communicate substantive market data of the type utilized by market data applications. Alternatively, other formats are also possible.

MEP agent 156 stores some user information, such as encrypted user passwords and access permissions, in a local cache 157. Local cache 157 is part of a shared memory. To make sure the user information in local cache 157 is reliably available, it is also saved as local cache disk image 168. Also, local cache 157 contains a dynamic table for expanding access permissions, which is also backed up as table disk image 166. Local cache 157 further contains some server configuration information pertaining to customer number and identities of the primary and backup MEP servers.

At system start-up, local cache 157 is loaded from the disk images 166, 168. However, if disk images 166, 168 have been corrupted, a complete reload will be requested from master entitlement processor set 102. Integrity of the local cache is preferably checked daily by master entitlement processor set 102. Because user information is stored in local cache 157, MDS1 140 does not have to request user information from the MEP's as often, which results in quicker, more efficient operations.

Another important function of MEP agent 156 is a throttling function, whereby the number of simultaneous conversations between MDS1 140 and master entitlement processor set 102 is limited. As discussed below, dynamic loadbalancing between MDS's in a domain is also preferably employed to help prevent overburdening any single MDS with too many simultaneous conversations. MEP agent 156 notifies the alert server 162 and the FIS daemon 178, when access permission information is changed. The MEP agent also logs communication activity and any errors to a log file.

The up-to-date user information maintained in local cache 157 by MEP agent 156, is utilized by MDS applications 160. For example, the MDS applications 160 may include a market data application which is accessed by users logged into MDS1 140 to receive current financial information from various financial exchanges. User information from local cache 157 will be used when a user logs in (as discussed in detail below), and also as the user attempts to access various features of MDS applications 160 for which she may or may not have the required access permissions.

MDS applications 160 include an MEP agent application program interface (API) 161 for communicating between MEP agent 156 and the MDS applications 160. More specifically, user information is delivered as needed by the MDS applications from the local cache to MEP agent API 161 via line 192. MEP agent API 161 provides functions to convert user information maintained by the MEP's into a format which is meaningful to MDS applications 160.

More particularly, MEP agent API 161 expands a binary, table-driven access permission list into meaningful access permission information in a format which can be directly utilized by MDS applications 160. This access permission expansion will now be discussed with reference to FIGS. 1 and 3 to 5.

Figures 2, 4:
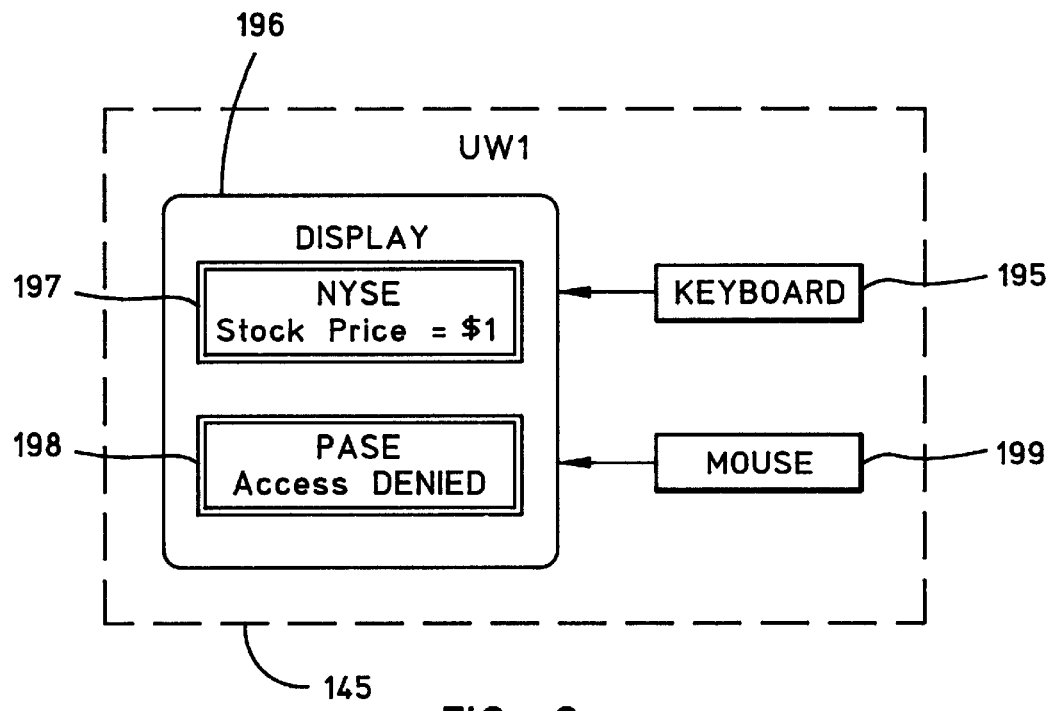
FIG. 2 is a block diagram of a user workstation portion of FIG. 1.
FIG. 4 is a table of access permission lists which is stored in the FIG. 1 system.

FIG. 4 shows access permission lists 201 for all users of the domain 135 stored in a tabular format in local cache 157. Identical access permission lists 201 are also stored on MDS2 142 (the other MDS in branch office domain 135) and on each of the MEP's 103, 132, 134. Of course, when there is a change to these permission lists, updates should be effected in each of these locations.

The access permission lists 201 are preferably not stored in MDS3 143 and MDS 4 144, the MDS's of central server farm domain 137, because MDS3 143 and MDS4 144 can pull this information down from master entitlement processor set 102 on the infrequent occasions that it is required. However, if the system 100 included additional branch office domains, then access permission lists for the users of branch office domain 135 would probably not be stored in these additional domains because the users of branch office domain 135 would not generally be logged into these other domains.

One example would occur in the case of users who are designated as "roamers." These users are allowed to log into any domain, and their user information (such as their access permission lists) would be accessible in all of the MDS's in all the domains enterprise-wide in order to facilitate their roaming from branch office to branch office.

The exemplary access permission lists of FIG. 4 are access permission lists for eight users from user number 000 (binary) to user number 111 (binary). In this simplified example, there are four services for which each of the users may or may not be permitted access. These four services are represented by four bit positions BIT 1, BIT 2, BIT 3 and BIT 4 in the four-bit access permission list. Each user therefore has an associated four-bit permission list where each bit position corresponds to whether the user has access to the service (1=access permitted), or alternatively, does not have access to the service (0=access denied). For example, user number 011 shown in FIG. 4 has access to the service corresponding to BIT 1, but does not have access to the services corresponding to BIT 2, BIT 3 and BIT 4.

One benefit of the access permission list format of FIG. 4 is flexibility. As the services offered change or expand, access permission lists 201 can easily be changed because they are in a binary format in the form of a table-driven list. For example, if the service corresponding to BIT 1 is no longer available, the access permission lists can be shortened to three bits and the three bits can be appropriately mapped to the three remaining services. As another example, if the number of possible services expands, then bits can be accordingly added to access permission lists 201. This compact, flexible access permission list format helps facilitate efficient maintenance of up-to-date access permission lists in the MDS's of domain 135 and the various MEP's 103, 132, 134 at the various locations in the enterprise-wide system 100.

While access permission lists 201 are compact and flexible in format, these lists generally cannot be directly utilized by MDS applications which are on user workstations or on MDS's. For this reason, MEP agent API 161 is programmed to expand the access permission lists into access permission information of a format which can be directly utilized by applications. This expansion is achieved by reference to a dynamic table 203 as will now be explained with respect to FIG. 5.

Dynamic table 203 is stored in local cache 157, and is also preferably stored at other MEP's and MDS's throughout the system. As mentioned above, it is also stored as a disk image 166 in MDS1 140. The dynamic table maps each bit position of the access permission lists 201 to longer format service names and codes in predefined formats conventionally used by market data applications.

For example, the exemplary dynamic table 203 has five fields of expansion information for each of the four bit positions BIT 1 to BIT 4. The five fields are: (1) hard code (numeric), (2) hard code (alphanumeric), (3) service name, (4) service grouping, and (5) long name. As shown in dynamic table 203, each of the services in this example refers to access to a particular financial exchange. However, access permission lists may have bit positions corresponding to other types of features, such as access to particular stocks, access to particular types of quote information, and so on.

Once the access permission lists 201 for a user has been expanded using dynamic table 203, MDS application 160 will be able to determine which types of access to allow. For example, in FIG. 2, user number 001 is logged into MDS1 140 through UW1 145. The user receives market data provided by MDS applications 160 resident in MDS1 140 on the display 196 of UW1 145. UW1 also includes input devices keyboard 195 and mouse 199. As shown in FIGS. 4 and 5, user number 001 has access to the New York Stock Exchange because BIT 1 of her permission list 201 is set to 1, and because dynamic table 203 maps BIT 1 to the New York Stock Exchange. However, user number 001 does not have access to the Pennsylvania Stock Exchange because BIT 2 is set to 0 in her access permission list.

In this preferred embodiment of the present invention, if user number 001 required access to the Pennsylvania Stock Exchange, then this change in her access permission list could be effected in MEP1 103 database 122 through MIS-PC's 124, 128, but not through UW1 145 and MDS1 140 of the user computer system 101. MEPI 103 would then distribute this change in access permission to the other MEP's 132 and 134, and to all of the MDS's 140, 142 of domain 135.

The use of a dynamic table as explained above has a powerful speed advantage, which is especially important in the market data application context. In market data applications and other speed-critical applications, user information data must generally reach its destination within one second. The use of a dynamic table allows the access permission lists to be compacted, often into 100 bytes or less. These compact access permission lists can be sent through the system very quickly, and thereby help keep all the necessary information moving through the system at high requisite speeds.

In this preferred embodiment, the method of changing a user's access permission list is relatively restricted for billing reasons, but it is noted that the two-way communication of user information between the MDS's and the MEP's according to the present invention also makes it possible to have embodiments wherein access permission lists 201 and dynamic table 203 can be modified through an MDS or a user workstation.

As shown in FIG. 2, display 196 of UW1 145 observed by user number 001, her access permission list 201 allows the window 197 for displaying New York Stock Exchange information to display market information relating to this financial exchange as collected by MDS applications 160. On the other hand, window 198 for providing Pennsylvania Stock Exchange information indicates that access has been denied.

Figure 3:
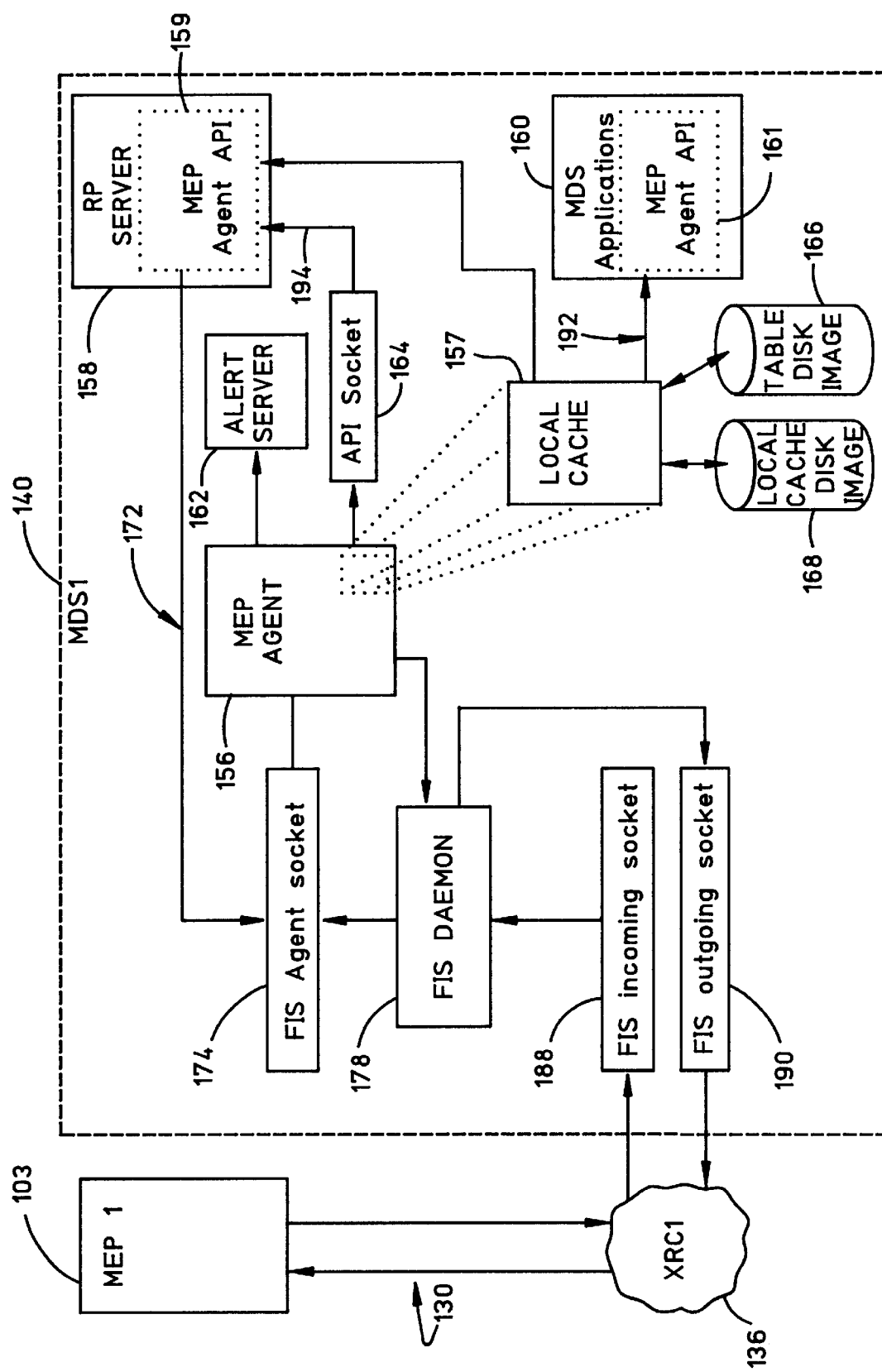
FIG. 3 is a block diagram of a market data server portion of FIG. 1.

Returning to the inner workings of MDS1 140 shown in FIG. 3, incoming user information from MEP's 103, 132, 134 comes into MDS 140 through FIS incoming socket 188 to FIS daemon 178. FIS daemon 178 decodes the incoming user information from FIS format, and sends it to MEP agent 156 via MEP agent socket 174. Outgoing user information from MEP agent 156, such as MEP database modification commands, are first sent to the FIS daemon 178 for formatting into FIS packets. The outgoing user information is then sent out to the master entitlement processor set 102 through FIS outgoing socket 190.

RP server 158 controls user login and passes permissions to workstations. To perform these functions RP server 158 can receive user information from local cache 157 or from MEP 103 via MEP agent 156 and API socket 164.

Figure 6:
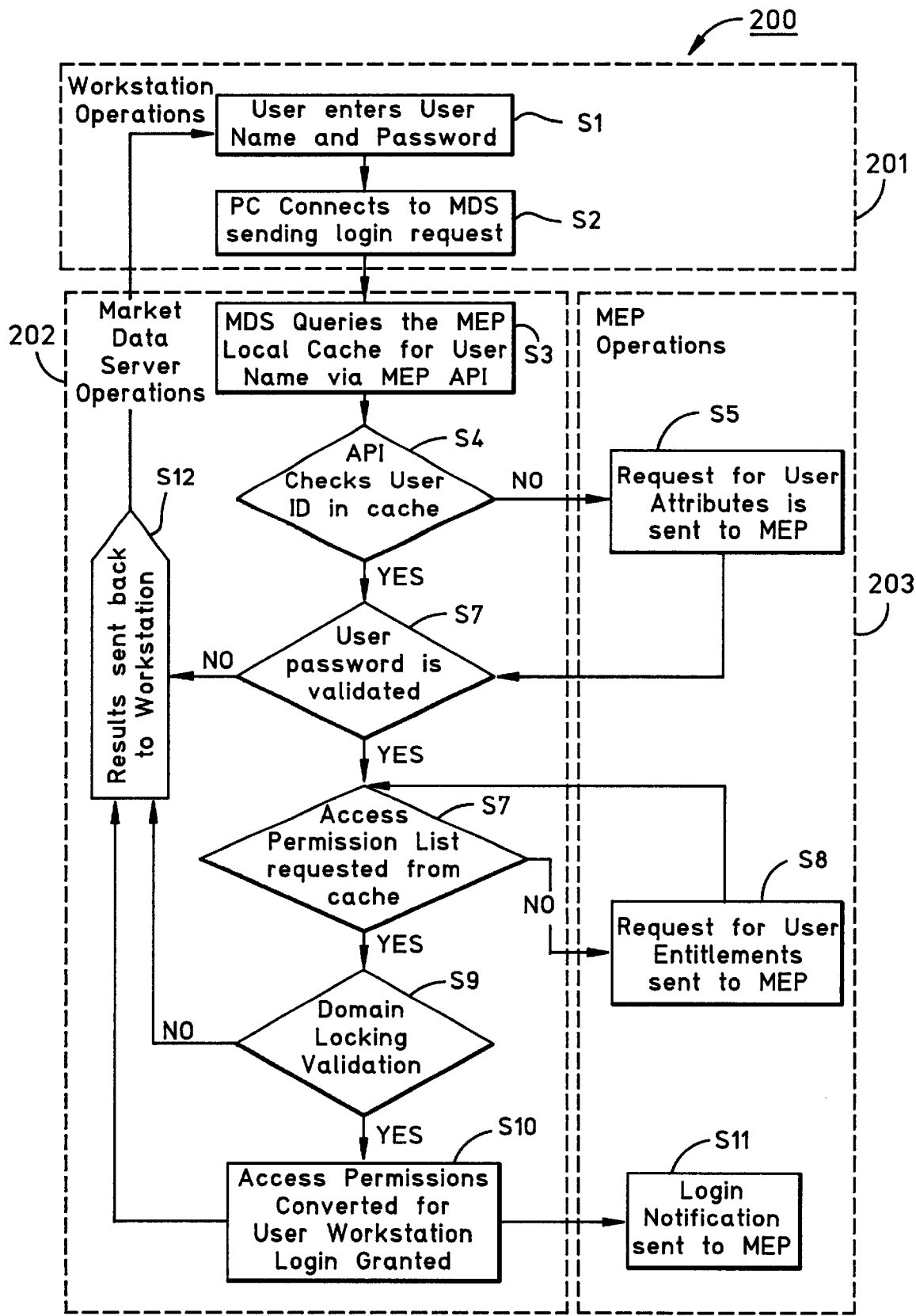
FIG. 6 is a flowchart showing a login process for user login to the master entitlement processor system of FIG. 1.

Now the process of logging users into user computer system (UCS) 101 will be described with reference to FIG. 6. FIG. 6 is a flowchart of login process 200 which generally includes workstation operations 201, market data server operations 202 and MEP operations 203. First, at step S1, a user desiring to login to the system 101 to run the market data applications 160 enters her unique user ID (for example, user number) and user password at a user workstation.

At step S2, the user workstation connects to an MDS, and sends the login request along with the user ID and user password entered by the user. At step S3, the MDS queries the user information stored within the local cache of the MDS (for example, local cache 157).

At step S4, the API (for example, MEP agent API 161) determines whether the user ID is in the local cache. Generally, user information for each user is maintained in each server of the user's designated primary domain. If the user is a designated user of the domain, then the user number will probably be in the local cache.

However, if the user is as a roamer, the user will generally not be in the local cache if the roamer attempts to log in to a server outside of her primary domain. In this case, the user information for the roamer may be obtained by any server in the system from the MEP's. If step S4 determines that the user ID is in the local cache, processing proceeds to step S6.

On the other hand, if step S4 determines that the user ID is not in the local cache of the MDS, then at step S5 a request of user ID and password relating to the user is sent to and received by one of the MEP's in the system. As long as the user ID does exist somewhere in the enterprise, the MEP will have complete user information in its MEP database, and the necessary user information will be sent back to the requesting MDS. Processing proceeds to step S6.

At step S6, the user password can now be validated in the MDS (in light of user information in the local cache or alternatively received from an MEP). If the user password is not validated, then prossing proceeds to step S12, and the negative results are sent back to the user workstation. On the other hand, if the user password is validated, then processing proceeds to step S7.

At step S7, the user's access permission list is requested from the local cache. If the local cache has the access permission list, then processing proceeds to step S9. On the other hand, if the access permission list is not in the local cache, then a request for this information is sent to and received by the MEP at step S8. At step S8, the MEP sends the requested information back to the MDS, which stores this information in the local cache and repeats step S7.

At step S9, domain validation locking is performed to ensure that the user can log into the domain only once. At step S10, the access permission list is expanded by the dynamic table (as explained above) and login is granted in accordance with the user's permissions. Notification of login is sent to the MEP at step S11 which keeps track of this information for user tracking and user login purposes. It is noted that the two-way data communication between the MDS and MEP of the present invention makes it possible for the MEP to receive this user information.

Notification of the login and expanded permission information is also sent back to the user workstation at step S12. The user workstation software can directly utilize the expanded permission information to control the user's access to various features based on the identity of the user.

Because the present invention allows users to be logged into more than one MDS within a domain, and also (depending on system design) allow a user to log into MDS's in more than one domain, user locking becomes somewhat important. User locking prevents a user from being logged into more than one MDS at the same time. Since the present invention allows communication of user information from the MDS's up to the MEP's, information about which MDS a user logs into can be transmitted up to the MEP's so that this user information quickly becomes available on an enterprise-wide basis. In this way, the present invention facilitates quick, enterprise-wide user locking.

Static loadbalancing may be used to distribute users among the different domains of the system according to a predetermined, priority rules. In these static load balancing embodiments, the user information for a user will set priority rules with respect to which domains the user can log into.

For example, user information may specify that the user (1) will preferably be logged into one of the MDS's 140, 142 of branch office domain 135, (2) will be logged into one of the MDS's 143, 144 as a secondary preference (for example, if there is domain failure of domain 135); and (3) will not be logged into any other domains which may exist in the UCS 101. In this way, the user has flexibility to be logged into four different servers (among two domains), while still being prevented from being logged into other MDS's in domains which may be geographically remote or may be heavily burdened with other users.

Static loadbalancing may also be used to distribute users among the different MDS's of a domain system according to a predetermined priority rules. In these embodiments of the present invention, the user sets priority rules with respect to which MDS's of the domain the user can log into.

For example, a user information may specify that the user: (1) will preferably logged into MDS 1140; (2) will be logged into one of the MDS2 142 as a secondary preference (for example, if there is MDS failure of MDS1 140); and (3) will not be logged into any other MDS's which may exist in the UCS 101. In this way, the user has flexibility to be logged into two different servers, while still being prevented from being logged into other MDS's in domains which may be geographically remote or may be heavily burdened with other users.

Alternatively, dynamic loadbalancing may be used to distribute users within a domain. According to dynamic loadbalancing within a domain, a user will generally be sent to the MDS with the most capacity. For example, in FIG. 1, MDS1 140 and MDS2 142 are servers with equivalent capacity. Suppose a first user logs into MDS1 140 through UW1 145. Subsequently, a second user attempts to log into domain 135 through UW2 146. According to dynamic loadbalancing, this second user will preferably logged into MDS2 142, because this user is not burdened by any users.

In this way, users can continuously be logged into optimal MDS's from an MDS loading standpoint. More aggressively, dynamic loadbalancing may involve switching the already logged-in users between various MDS's in the domain depending on the load.

One highly preferred way of handling MDS and domain load is to use dynamic loadbalancing within a domain, but to use static loadbalancing between domains. In this way, users will generally be limited to access through either their branch office domain or a central server farm acting as a back-up. These limitations can help insure that users are logged into MDS's which are geographically proximate. This limitation can also help limit the maximum loads which may be experienced in a particular branch office domain, and can help in evaluation of the MDS capacity necessary in each branch office domain.

Figure 7:
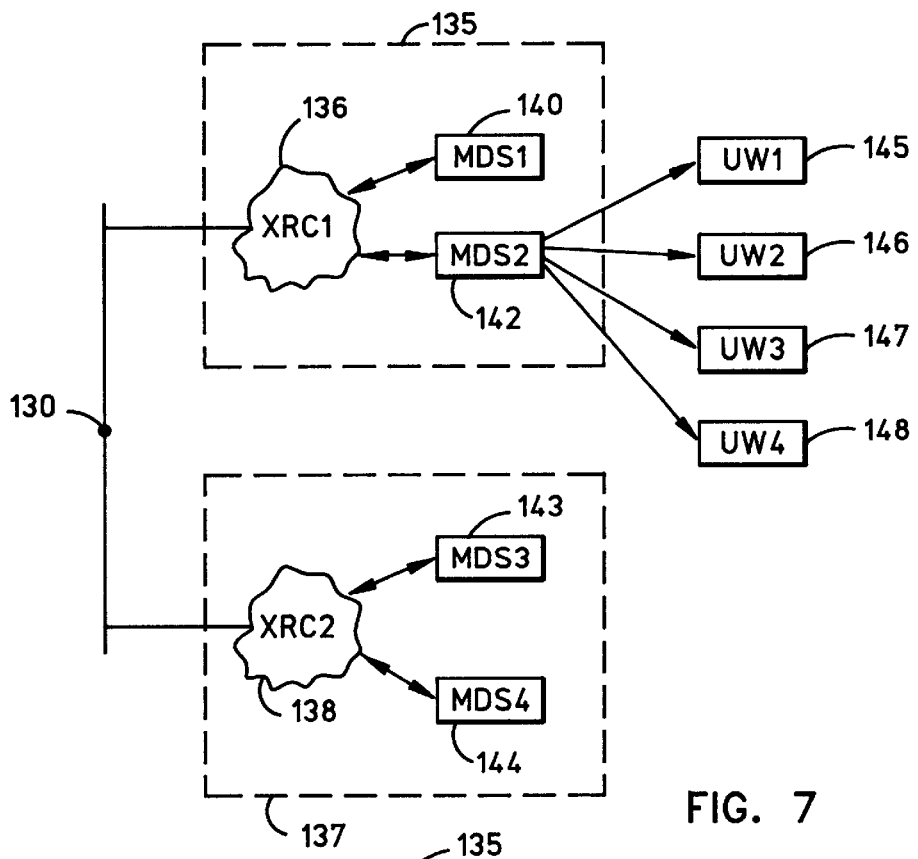
FIG. 7 is a block diagram showing the user computer system (UCS) portion of the embodiment of FIG. 1 after a failure condition occurs in one of the market data servers.

Now the aspects of failover and failback will be discussed with reference to FIGS. 1, 7 and 8. The domain concept of the present invention allows failover and failback to be accomplished in a robust and efficient manner. Generally failover occurs when user(s) are switched from a first MDS to a second MDS upon a failure condition. Failback is the reverse operation, when users are switched back to the first MDS after the failure condition has ended.

Because the domain organization of the present invention allows the system to be set up so that users may log into more than one MDS, failover is easily accomplished. In FIG. 1, users at workstations UW1 145 and UW3 147 are logged into MDS1 140, while users at workstations UW2 146 and UW4 148 are logged into MDS2. FIG. 7 shows the failover after MDS1 140 experiences a failure condition. As shown in FIG. 7, all of the users are switched to MDS2 142, the other MDS in their domain 135. Because MDS2 is in the users' domain 135, it has already been contemplated that these users may be logged into MDS2 142, making the failover operation easy to effect.

Figure 8:
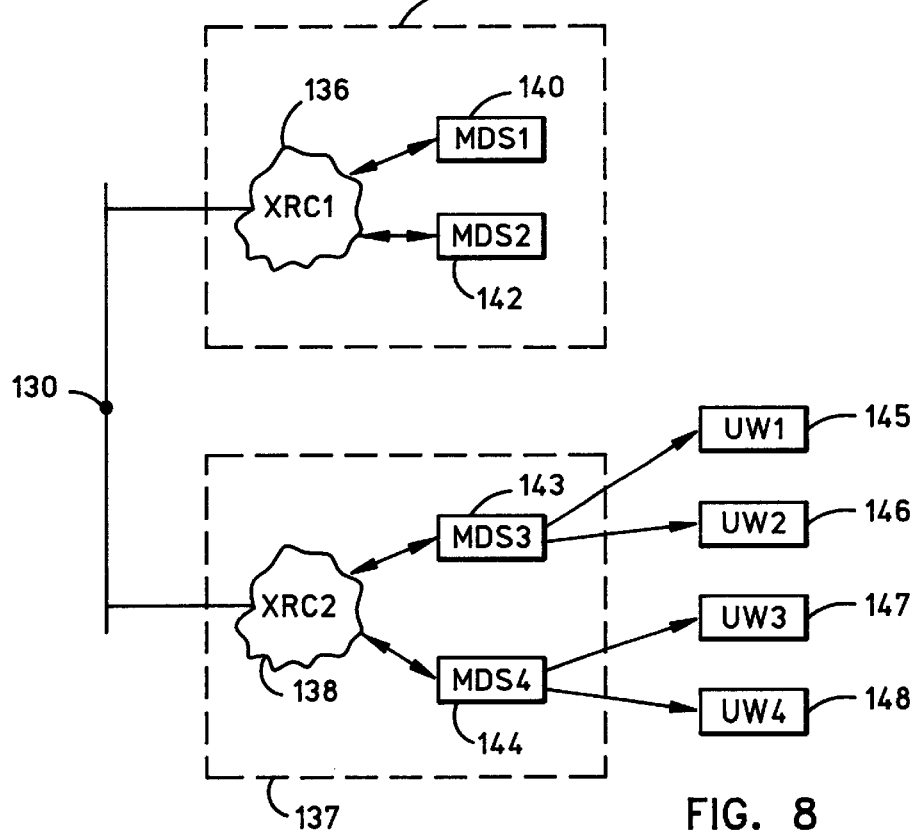
FIG. 8 is a block diagram showing the user computer system (UCS) portion of the embodiment of FIG. 1 after a domain-wide failure condition occurs in one of the domains.

FIG. 8 shows failover when all MDS's 140, 142 in domain 135 fail. Upon this domain-wide failure condition, all users are switched to central server farm domain 137. More particularly, these users are distributed between MDS3 143 and MDS4 144 of the central server farm domain 137 according to a dynamic loadbalancing scheme in order to optimize load within the central server farm domain 137.

Certain preferred embodiments have been described above. It is likely that there are modifications and improvements to these embodiments which are within the literal scope or are equivalents of the claims which follow.

What is claimed is:
1. A master entitlement processor system comprising:
   a master entitlement processor (MEP);
   a user computer system (UCS) having at least one data server, the at least one data server comprising:
      a computer readable storage medium for storing a table-driven access permission list in the form of a variable-length string of bits wherein one or more bits represent the status of a specific permission for the user;
      local cache memory for storing a dynamic table; and
      a computer readable medium having computer-executable instructions for expanding the table-driven permission list into expanded permission information in a predetermined format using the dynamic table, which expanded permission information can be directly utilized by the application;
   communication means for providing two-way communication between the MEP and the UCS;
   MEP code located in the MEP, the MEP code comprising:
      an MEP database of user information; and
      MEP database modification instructions for receiving database modification data from the UCS through the communication means, and for causing modifications to the MEP database according to the database modification data; and
   UCS code located in the UCS, the UCS code comprising:
      an application for utilization by a user, wherein the application is controlled at least in part by a portion of the user information which corresponds to the user, and
      user-specific MEP data-send instructions for sending the user-specific database modification data to the MEP through the communication means while the user is currently in communication with the UCS.

2. The master entitlement processor system according to claim 1, wherein the MEP comprises a plurality of MEP computers, with the MEP code being redundantly stored on at least two of the MEP computers.

3. The master entitlement processor system according to claim 1, wherein the UCS further comprises a personal computer.

4. The master entitlement processor system according to claim 1, wherein the communication means comprises a network of telephone lines.

5. The master entitlement processor system according to claim 1, wherein the application is a market data application for providing the user with current financial information.

6. The master entitlement processor system according to claim 1, wherein:
   the user information comprises user identification numbers and associated user passwords; and
   a user password can be changed in the MEP database by the MEP data-send instructions causing database modification data to be sent to the MEP through the communication means to thereby cause the MEP database modification instructions to modify the user password in the MEP database.

7. The master entitlement processor system according to claim 1, wherein the user information comprises access permission lists for each user which control each user's access to various features of the application.

8. The master entitlement processor according to claim 1, wherein the UCS further comprises means for storing at least a portion of the user information.

9. The master entitlement processor system according to claim 8, wherein the means for storing comprises the cache memory.

10. The master entitlement processor system according to claim 8, wherein the means for storing comprises a magnetic storage medium.

11. The master entitlement processor system of claim 1, wherein the table-driven access permission list relates to the extent of the user's permitted access to a market data database comprising financial information.

12. The master entitlement processor system of claim 1, wherein the dynamic table comprises fields for hard numeric code, a hard alphanumeric code, a service name, a service group code and a long name.

13. The master entitlement processor system according to claim 1, wherein the dynamic table comprises predetermined fields.

14. The master entitlement processor system according to claim 1, wherein the local cache memory includes the computer readable storage medium for storing a table-driven access permission list.

15. A master entitlement processor system comprising:
   a master entitlement processor (MEP);
   a user computer system (UCS) having at least one data server, the at least one data server comprising:
      means for storing a table-driven access permission list in the form of a variable-length string of bits wherein one or more bits represent the status of a specific permission for the user;

means for storing a dynamic table, the dynamic table comprises predetermined fields; and means for expanding the table-driven permission list into expanded permission information in a predetermined format using the dynamic table, which expanded permission information can be directly utilized by the application;

communication means for providing two-way communication between the MEP and the UCS;

MEP code located in the MEP, the MEP code comprising:
an MEP database of user information; and
MEP database modification instructions for receiving database modification data from the UCS through the communication means, and for causing modifications to the MEP database according to the database modification data; and UCS code located in the UCS, the UCS code comprising:
an application for utilization by a user, wherein the application is controlled at least in part by a portion of the user information which corresponds to the user, and
user-specific MEP data-send instructions for sending the user-specific database modification data to the MEP through the communication means while the user is currently in communication with the UCS.

16. The master entitlement processor of claim 15, wherein the table-driven access permission list relates to the extent of the user's permitted access to a market data database comprising financial information.

17. The master entitlement processor system according to claim 15, wherein the predetermined fields comprise a hard numeric code field, a hard alphanumeric code field, a service name field, a service group field and a long name field.

18. The master entitlement processor system according to claim 15, the at least one server further comprising a cache memory comprising the means for storing a table-driven access permission list and the means for storing a dynamic table.

19. The master entitlement processor system according to claim 18, wherein the predetermined fields comprise a hard numeric code field, a hard alphanumeric code field, a service name field, a service group field and a long name field.

20. A master entitlement processor system comprising:
a master entitlement processor (MEP);
a user computer system (UCS) comprising:
a domain comprising a plurality of server computers;
at least one user workstation; and
program code located in each of the plurality of server computers, the program code comprising login instructions which control operations allowing a user to log into any one of the plurality of server computers in the domain through the user workstation, and thereafter to receive data from the server computer which the user is logged into through the user workstation;

communication means for providing two-way communication between the MEP and the UCS;

MEP code located in the MEP, the MEP code comprising:
an MEP database of user information; and
MEP database modification instructions for receiving database modification data from the UCS through the communication means, and for causing modifications to the MEP database according to the database modification data; and UCS code located in the UCS, the UCS code comprising:
an application for utilization by a user, wherein the application is controlled at least in part by a portion of the user information which corresponds to the user, and
user-specific MEP data-send instructions for sending the user-specific database modification data to the MEP through the communication means while the user is currently in communication with the UCS;

wherein the MEP is structured and programmed to store user information relating to the user and the communication means communicates the user information from the MEP to all of the server computers of the domain.

21. The master entitlement processor system of claim 20, wherein the login instructions designate one of the server computers in the domain as a primary server computer and provide that the user will preferably be logged into the primary server computer.

22. The master entitlement processor system of claim 20, wherein the server computer that the user is logged into sends market data through the user workstation.

23. The master entitlement processor system of claim 22, wherein the domain receives market data from a financial exchange.

24. The master entitlement processor system of claim 20, wherein the program code comprises user-tracking instructions that cause each server computer in the domain to keep track of whether the user is logged into any of the server computers.

25. The master entitlement processor system of claim 24, wherein the program code comprises duplicative-login instructions that prevent the user from logging into more than one server computer.

26. The master entitlement processor system of claim 20, wherein the program code comprises failover instructions that switch the user from a first server computer of the plurality of server computers to a second server computer of the plurality of server computers upon a failure condition.

27. The master entitlement processor system of claim 26, wherein the failure condition is a failure of the first server computer.

28. The master entitlement processor system of claim 26, wherein the failure condition is a failure in a flow of information from a financial exchange to the first server computer.

29. A master entitlement processor system comprising:
a master entitlement processor MEP);
a user computer system (UCS) comprising:
a first domain comprising a plurality of first-domain server computers;
a second domain comprising a plurality of second-domain server computers;
at least one user workstation; and
program code located in each of the server computers, the program code comprising login instructions which control operations allowing a user to log into any one of the server computers in at least one of the first and second domains, and thereafter to receive data from the server computer which the user is logged into through the user workstation;

communication means for providing two-way communication between the MEP and the UCS;

MEP code located in the MEP, the MEP code comprising:
an MEP database of user information; and
MEP database modification instructions for receiving database modification data from the UCS through the communication means, and for causing modifications to the MEP database according to the database modification data; and UCS code located in the UCS, the UCS code comprising:
an application for utilization by a user, wherein the application is controlled at least in part by a portion of the user information which corresponds to the user, and
user-specific MEP data-send instructions for sending the user-specific database modification data to the MEP through the communication means while the user is currently in communication with the UCS,
wherein the MEP is structured and programmed to store user information relating to the user and the communication means communicates the user information from the MEP to the server computers in the first domain and the second domain.

30. The master entitlement processor system of claim 29, wherein the user receives market data from the server computer that the user is logged into through the user workstation.

31. The master entitlement processor system of claim 29, wherein the program code further comprises static-loadbalancing instructions that designate the first domain as the primary domain, whereby the user will preferably be logged into one of the first-domain server computers.

32. The master entitlement processor system of claim 31, wherein the program code further comprises domain-failover instructions that switch the user from the primary domain to the second domain upon a failure condition of every first-domain server computer.

33. The master entitlement processor system of claim 32, wherein the second domain is an enterprise-wide server farm.

34. The master entitlement processor system of claim 32, wherein the program code further comprises dynamic-loadbalancing instructions for determining which first-domain server computer the user will preferably be logged into at the time of login.

35. The master entitlement processor system of claim 34, wherein the program code comprises server-failover instructions that will switch which first-domain server the user is logged into upon a failure condition.

36. The master entitlement processor system according to claim 29, wherein the UCS further comprises a cache memory for storing at least a portion of the user information retained substantially concurrently within the MEP database.

37. The master entitlement processor system according to claim 36, wherein the cache memory is in communication with at least one magnetic storage medium for saving the cache memory.

* * * * *